(12) United States Patent
Lee et al.

(10) Patent No.: US 8,305,699 B2
(45) Date of Patent: Nov. 6, 2012

(54) WAFER-LEVEL LENS MODULE WITH EXTENDED DEPTH OF FIELD AND IMAGING DEVICE INCLUDING THE WAFER-LEVEL LENS MODULE

(75) Inventors: Seung-Wan Lee, Suwon-si (KR); Woon-Bae Kim, Seoul (KR); Jeong-Yub Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 12/873,461

(22) Filed: Sep. 1, 2010

(65) Prior Publication Data

US 2011/0069216 A1 Mar. 24, 2011

(30) Foreign Application Priority Data

Sep. 23, 2009 (KR) .................. 10-2009-0089876
Mar. 3, 2010 (KR) .................. 10-2010-0019155

(51) Int. Cl.
*G02B 9/00* (2006.01)
(52) U.S. Cl. ....................................... 359/796
(58) Field of Classification Search .................. 359/796, 359/797
See application file for complete search history.

(56) References Cited

U.S. PATENT DOCUMENTS

| 5,880,879 | A | 3/1999 | Foo |
| 6,618,201 | B2 | 9/2003 | Nishikawa et al. |
| 6,850,368 | B2 | 2/2005 | Shimizu et al. |
| 6,933,584 | B2 | 8/2005 | Miyazaki et al. |
| 6,949,808 | B2 | 9/2005 | Harazono |
| 7,019,375 | B2 | 3/2006 | Harazono |
| 7,042,645 | B2 | 5/2006 | Houlihan et al. |
| 7,336,430 | B2 | 2/2008 | George et al. |
| 7,391,458 | B2 | 6/2008 | Sakamoto |
| 7,525,732 | B2 | 4/2009 | Uehara et al. |
| 7,633,544 | B2 | 12/2009 | Woo et al. |
| 7,817,359 | B2 | 10/2010 | Tsai |
| 2003/0090987 | A1 | 5/2003 | Kitahara et al. |
| 2003/0157211 | A1 | 8/2003 | Tsunetomo et al. |
| 2004/0090571 | A1 | 5/2004 | Fujita |

(Continued)

FOREIGN PATENT DOCUMENTS

EP 1 413 900 A2 4/2004

(Continued)

OTHER PUBLICATIONS

Kolodziejczyk, A. et al., "The light sword optical element—a new diffraction structure with extended depth of focus", Journal of Modern Optics, 1990, pp. 1283-1286, vol. 27, No. 8.

(Continued)

*Primary Examiner* — Darryl J Collins
(74) *Attorney, Agent, or Firm* — Sughrue Mion, PLLC

(57) ABSTRACT

A wafer-level lens module with an extended depth of field (EDF) and an imaging device including the wafer-level lens module are provided. The wafer-level EDF lens module includes a plurality of wafer-scale lenses stacked with fixed distances therebetween. The plurality of wafer-scale lenses includes an effective lens having a profile which satisfies a corrected optimized aspheric function, wherein a profile of a center region of the effective lens is optimized for an infinity-focused image and a profile of an edge region of the effective lens is optimized for a macro-focused image.

16 Claims, 7 Drawing Sheets

U.S. PATENT DOCUMENTS

| | | | |
|---|---|---|---|
| 2005/0074702 A1 | 4/2005 | Lee et al. | |
| 2005/0271375 A1 | 12/2005 | Watanabe et al. | |
| 2006/0126180 A1 | 6/2006 | Jung et al. | |
| 2007/0046862 A1 | 3/2007 | Umebayashi et al. | |
| 2008/0100934 A1 | 5/2008 | Webster et al. | |
| 2008/0121784 A1 | 5/2008 | Chang et al. | |
| 2008/0123199 A1 | 5/2008 | Hong | |
| 2008/0266442 A1* | 10/2008 | Wakano et al. | 348/340 |

FOREIGN PATENT DOCUMENTS

| | | | |
|---|---|---|---|
| EP | 1 443 754 A2 | 8/2004 | |
| JP | 2000-66097 A | 3/2000 | |
| JP | 2000-301550 A | 10/2000 | |
| JP | 2001-83414 A | 3/2001 | |
| JP | 2003-86779 A | 3/2003 | |
| JP | 2003-140036 A | 5/2003 | |
| JP | 2003-179217 A | 6/2003 | |
| JP | 2003-211462 A | 7/2003 | |
| JP | 2004-40287 A | 2/2004 | |
| JP | 2004-61623 A | 2/2004 | |
| JP | 2004-163695 A | 6/2004 | |
| JP | 2005-333170 A | 12/2005 | |
| JP | 2006-45029 A | 2/2006 | |
| JP | 2007-025297 A | 2/2007 | |
| JP | 2007-65126 A | 3/2007 | |
| JP | 2008-129606 A | 6/2008 | |
| KR | 10-2005-0010343 A | 1/2005 | |
| KR | 10-2005-0033987 A | 4/2005 | |
| KR | 10-2005-0064560 A | 6/2005 | |
| KR | 10-2006-0070813 A | 6/2006 | |
| KR | 10-0647299 B1 | 11/2006 | |
| KR | 10-0691268 B1 | 3/2007 | |
| KR | 10-2008-0072333 A | 8/2008 | |
| KR | 10-2008-0099031 A | 11/2008 | |
| KR | 10-2009-0037684 A | 4/2009 | |
| WO | 2005/008780 A1 | 1/2005 | |
| WO | 2008/011003 A2 | 1/2008 | |
| WO | 2008/133946 A1 | 11/2008 | |

OTHER PUBLICATIONS

Mikula, G. et al., "Imaging with extended focal depth by means of lenses with radial and angular modulation", Optics Express, Jul. 11, 2007, pp. 9184-9193, vol. 15, No. 15.

Mikula, G. et al., "Diffractive elements for imaging with extended depth of focus", Optical Engineering, May 2005, pp. 058001-1-058001-7, vol. 44, No. 5.

Davidson, N. et al., "Holographic axilens: high resolution and long focal depth", Optical Society of America, 1991, pp. 523-525, vol. 16, No. 7.

Office Action issued Feb. 11, 2011 in co-pending U.S. Appl. No. 12/537,283.

Office Action issued May 19, 2011 in co-pending U.S. Appl. No. 12/537,283.

Extended European Search Report issued Jul. 29, 2010 in counterpart European Application No. 10160047.6.

* cited by examiner

WAFER-LEVEL LENS MODULE WITH EXTENDED DEPTH OF FIELD AND IMAGING DEVICE INCLUDING THE WAFER-LEVEL LENS MODULE

CROSS-REFERENCE TO RELATED APPLICATION

This application claims priority from Korean Patent Applications No. 10-2009-0089876, filed on Sep. 23, 2009, and No. 10-2010-0019155, filed on Mar. 3, 2010, the disclosures of which are incorporated herein by reference.

BACKGROUND

1. Field

The following description relates to an optical imaging system, and more particularly, to a wafer-level lens module with an extended depth of field (EDF) and an imaging device including the wafer-level lens module.

2. Description of the Related Art

Following the development of digital technologies, digital convergence has become increasingly popular. Applications of digital convergence are most active in the field of media and communications. A representative digital convergence product is a so-called "camera phone" in which an imaging device such as a digital camera or a digital camcorder is combined with a mobile phone. Imaging devices such as digital cameras and the like are installed in various mobile electronic devices including laptop computers and Personal Digital Assistants (PDAs) in addition to mobile phones.

As mobile electronic devices with imaging devices need to be small and slimline and are becoming more popular, demands for small, light-weight and low-cost imaging devices are increasing. Particularly, in order to keep pace with the recent trend in which various digital electronic devices, such as MP3 players, portable multimedia players (PMPs), a digital multimedia broadcasting (DMB) televisions, and the like are also being integrated into a camera phone, the demands for small, low-cost imaging devices are further increasing.

One method of manufacturing a small, low-cost imaging device is to reduce the number of elements and to improve the manufacturing process to be more efficient and cost effective. A wafer-level imaging device has been developed to meet this demand. An optical imaging system of such a wafer-level imaging device includes a wafer-level lens module having a stacked structure of substrates, with a lens attached onto one or both sides of each substrate.

Additionally, a camera for a mobile device generally utilizes a voice coil motor (VCM) to vary a focal distance of an optical imaging system to provide auto-focus, macro-focus, and other focusing capabilities. In this case, the VCM is used to adjust the distance between a lens and a sensor so as to change the focal position of the optical imaging system. However, the addition of such a VCM raises manufacturing costs and limits the size reduction of the camera since a space for movement of the lenses has to be ensured.

In order to overcome these limitations, a digital auto-focus technique has been developed to implement auto-focus, and the like using only lenses and an algorithm, without the use of any additional elements such as a VCM. As a digital auto-focus technique, a method of extending the depth of a focus through defocusing has been proposed. An extended depth of field (EDF) lens module can be used for various optical applications, including imaging devices for mobile devices, camcorders, microscopes, security cameras and on the like.

An EDF lens module can form images having somewhat low definition but meeting constant quality criteria over a broad range since it has an EDF. Also, the EDF lens module can recover the definition of the formed images using a digital image processing technique. In such an EDF lens module, since there is a trade-off relationship between a lens design and an algorithm design for image processing, an appropriate balance therebetween is needed. For example, an excellent lens design leads to an algorithm which increases processing speed, but several limitations in lens design make high precision design difficult.

In order to implement the EDF characteristics through an algorithm, a point spread function (PSF) size has to be constant for different wavelengths (e.g. red, green, and blue), for different fields (positions in an image sensor), and for varying distances to an object (infinity, macro, etc.), and the shape of the PSF also has to be uniform. For example, since a short wavelength (for example, a blue ray among visible rays) has a relatively short focal distance, and a long wavelength (for example, a red ray among visible rays) has a relatively long focal distance, both wavelengths do not have enough similarity in spot size, which is a limitation in designing an excellent lens module.

Further, since a wafer-level lens module has a compact size and short distances between lenses, a camera for a mobile device, including the lens module, exhibits picture quality deterioration in a macro-focus mode due to the short focal distance.

SUMMARY

The following description relates to a wafer-level lens module with an extended depth of field (EDF), examples of which can ensure excellent picture quality regardless of incident light wavelength or distance to objects, without any addition of elements, and which are suitable for a 5 mega-pixel wafer-level imaging device, and an imaging device including the wafer-level lens module.

In one general aspect, there is provided a wafer-level lens module including a plurality of wafer-scale lenses stacked with fixed distances therebetween. The plurality of wafer-scale lenses include an effective lens having a profile which satisfies a corrected optimized aspheric function, such that a profile of a center region of the effective lens is optimized for an infinity-focused image and a profile of an edge region of the effective lens is optimized for a macro-focused image.

For example, the corrected effective lens may be composed of a first portion having a profile satisfying an optimized aspheric function, the first portion disposed at a radial center of the effective lens, a second portion having a profile satisfying the optimized aspheric function with a negative error correction, the second portion radially surrounding the first portion, and a third portion having a profile satisfying the optimized aspheric function with a positive error correction, the third portion radially surrounding the second portion. In this case, the first portion may extend to a radius not greater than 10% of the outer radius of the effective lens, and the second portion may extend to a radius not greater than about 40% to 50% of the outer radius of the effective lens. The negative error correction applied to the profile of the second portion may be from −0.03 nm to −0.15 nm, and the positive error correction applied to the profile of the third portion is 8 or more times an absolute value of the negative error correction. The positive error correction applied to the profile of the third portion may be 3 times a wavelength range of visible rays.

In another general aspect, there is provided a method of designing an extended depth of field (EDF) lens for a mobile device, including determining a profile of the EDF lens which satisfies an optimized aspheric function modified by predetermined profile errors, and forming the EDF lens according to the determined profile. The predetermined profile errors may be determined such that the EDF lens includes a first portion having a profile satisfying the optimized aspheric function, the first portion disposed at a radial center of the EDF lens, a second portion having a profile satisfying the optimized aspheric function with a negative error correction, the second portion radially surrounding the first portion, and a third portion having a profile satisfying the optimized aspheric function with a positive error correction, the third portion radially surrounding the second portion.

For example, the first portion may extend to a radius not greater than about 10% of the outer radius of the EDF lens, and the second portion may extend to a radius not greater than about 40-50% of the outer radius of the EDF lens. The negative error correction applied to the second portion is from −0.03 µm to −0.15 µm, and the positive error correction applied to the third portion is 8 or more times the absolute value of the negative error. The wafer-level lens module having the EDF lens may reduce costs for manufacturing separate elements since it does not utilize any filter. Furthermore, since only one surface of the first lens of the optimized aspheric lens is corrected and the corrected profile uses only one profile variable, costs incurred for manufacturing molds are low and also the molds can be easily manufactured. In addition, since the wafer-level lens module has no discontinuous boundaries as in a diffractive optical element (DOE), there is no light diffusion which would occur at such a boundary.

Other features and aspects will be apparent from the following detailed description, the drawings, and the claims.

Figure 1:
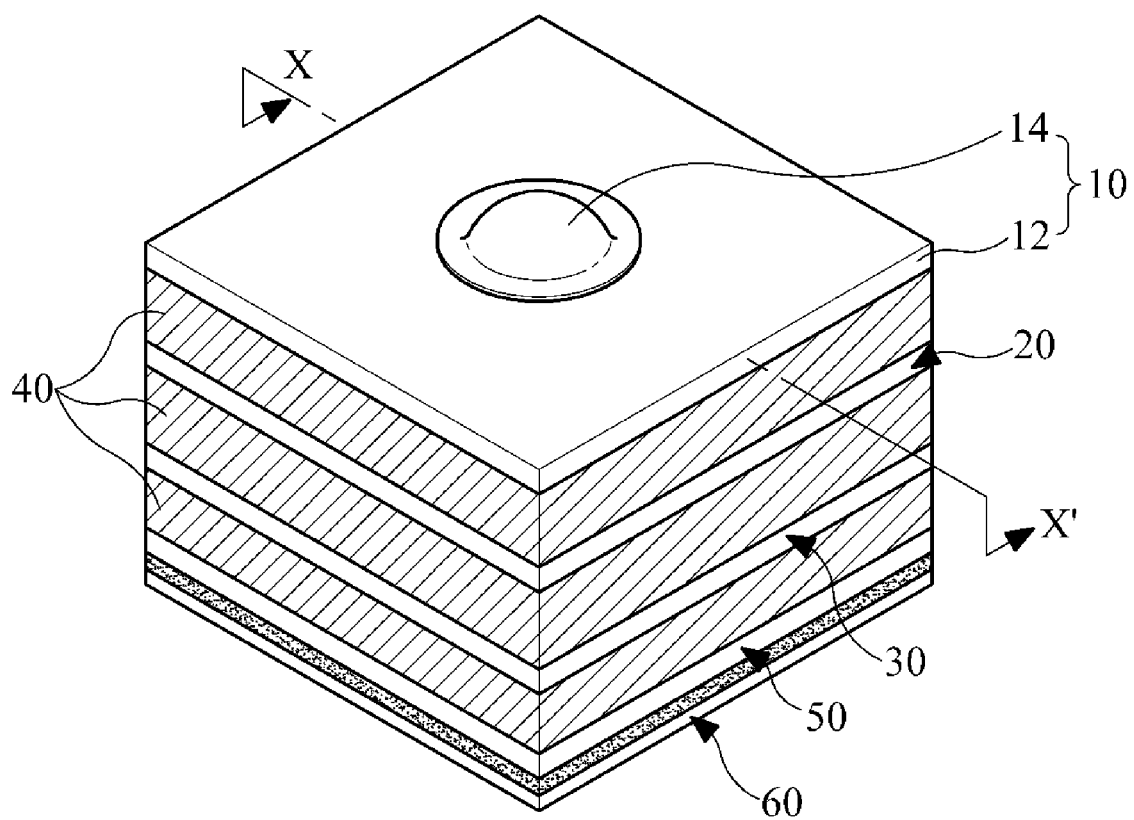
FIG. 1 is a perspective view illustrating an example of an imaging device that can be installed in a mobile device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Recently, in order to fulfill demands for small, low-cost imaging devices, a wafer-level lens module has been adopted for an imaging device. A wafer-level lens module includes a stacked structure of wafer-scale lenses. The wafer-scale lenses may be, instead of being coupled into a lens barrel, spaced by spacers and fixed. In this case, the intervals between the lens surfaces of the wafer-level lens module are fixed. In such a wafer-level lens module, generally, a structure in which three or more wafer-scale lenses (that is, 6 lens surfaces or more) are stacked is utilized to provide high-definition images including millions of pixels (recently, reaching 5 million or more of pixels). Hereinafter, the structure of a wafer-level lens module will be described.

Figure 2:
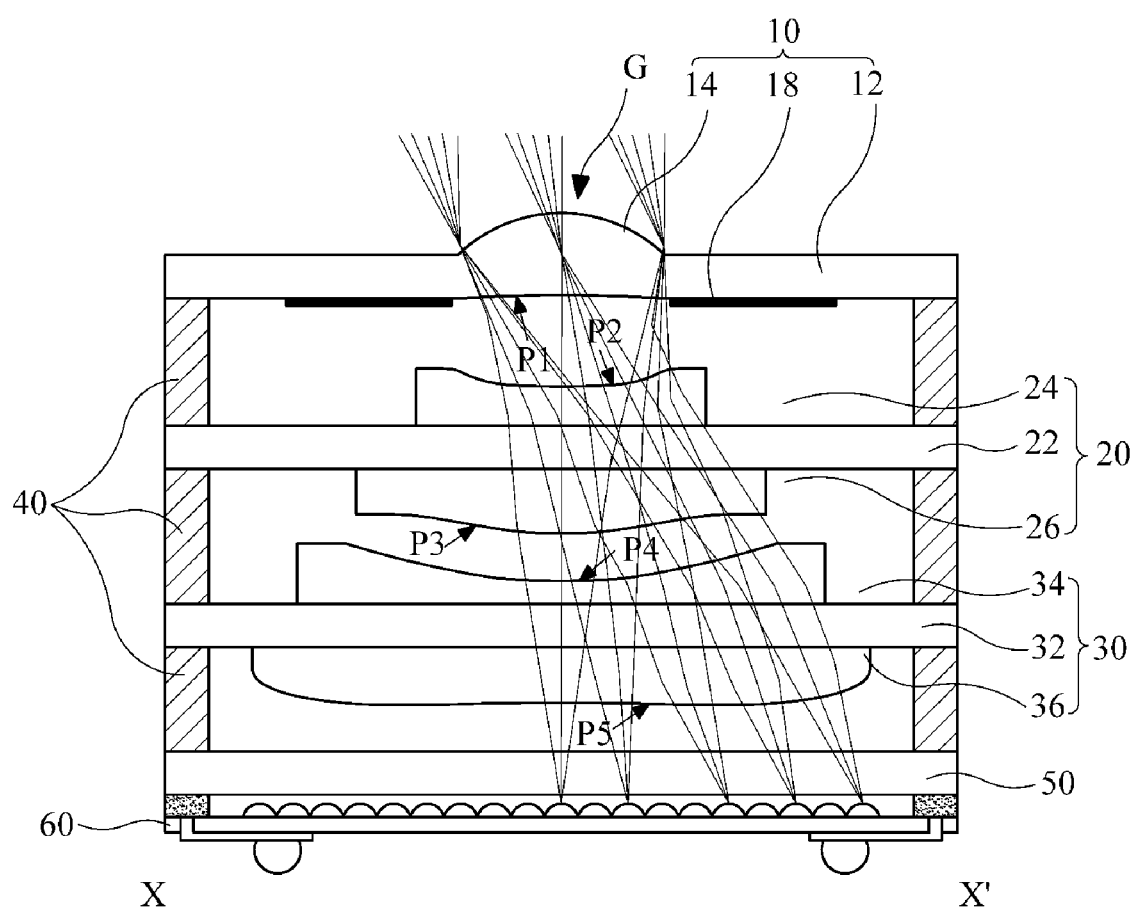
FIG. 2 is a cross-sectional view taken along a line X-X' of the imaging device illustrated in FIG. 1.

FIG. 1 is a perspective view illustrating an example of an imaging device that can be installed in a mobile device, and FIG. 2 is a cross-sectional view taken along a line X-X' of the imaging device illustrated in FIG. 1. In FIGS. 1 and 2, for convenience of description, elements constructing the imaging device are exaggerated in size, shape, thickness, and the like. The number (three) of substrates included in the imaging device is one example and the imaging device is not limited thereto.

Referring to FIGS. 1 and 2, the imaging device includes a wafer-level lens module in which wafer-scale lenses 10, 20 and 30 are stacked. The wafer-level lens module may have a rectangular shape and in this case, each of the wafer-scale lenses 10, 20 and 30 forming the wafer-level lens module has a quadrangle shape in plane view. Each lens element forming the wafer-scale lenses 10, 20 and 30 and the combined lens elements have a cylindrical structure which is symmetrical and exhibits the same shape with respect to all rotation angles and is centered on an optical axis.

The three wafer-scale lenses 10, 20 and 30 respectively include transparent substrates 12, 22 and 32 made of a transparent material, and lens elements 14, 24, 26, 34 and 36 formed on one or both sides of the respective transparent substrates 12, 22 and 32. As seen in the wafer-scale lens 10 which is the top layer of the wafer-level lens module, the lens element 14 may be integrated into the transparent substrate 12. The lens elements 14, 24, 26, 34 and 36 may be formed with various materials; for example, they all may be formed with a polymer, or some of them may be formed with glass and the remainder may be made with a polymer. The wafer-scale lens 10 which is the top layer may further include an aperture stop 18 to limit a received amount of light. The aperture stop 18 may be formed with an opaque metal film such as a chromium (Cr) film or made of an opaque material such as a photoresist.

The wafer-scale lenses 10, 20 and 30 are spaced a predetermined distance apart by spacers 40. One or more spacers 40 may also be used to maintain a predetermined gap between the wafer-scale lens 30 and the image sensor 60, in addition to ensuring spacing between the wafer-scale lenses 10, and 30. In this case, a spacer 40 may be positioned between the wafer-scale lens 30 and a cover glass 50 for protecting the image sensor 60. In the current example, the size of the spacers 40 are not limited and are appropriately determined in consideration of the entire thickness of the imaging device or the focal distance of the corresponding optical imaging system. However, it is notable that the spacers 40 may be formed along the edge portions of the wafer-scale lenses 10, 20 and 30, having a quadrangle shapes, and along the edge portion of the cover glass 50.

All or some of the lens elements 14, 24, 26, 34 and 36, which are spaced a predetermined distance apart by the spacers 40, may each have a predetermined aspheric profile. In this case, it is apparent to those of ordinary skill in the art that the respective profiles of the lens elements 14, 24, 26, 34 and 36 are in a close relationship with each other. Generally, the aspheric profiles of the lens elements 14, 16, 24, 26, 34 and 36 are determined such that the image sensor 60 is able to form images satisfying desired quality criteria under given conditions (for example, a given aperture diameter, a given number of lens surfaces, the given distances between the lens surfaces, the given size or pixel number of the image sensor). Hereinafter, a function representing a profile of a lens surface through which the focuses of all passing rays fall nearly accurately on the image sensor 60 (for example, a degree of defocusing does not exceed 0.01 mm over the entire lens surface), the profile of the lens surface satisfying the quality criteria, not in consideration of its depth of field, will be referred to as an "optimized aspheric function".

However, the optimized aspheric function of each of the lens elements 14, 24, 26, 34 and 36 forming the wafer-lens module is generally designed in consideration of an object that is within a predetermined distance range. That is, the profile of each of the lens elements 14, 24, 26, 34 and 36 is designed such that images with excellent picture quality can be obtained using the wafer-level lens module when objects are within a predetermined distance range (at an ideal location) or out of a predetermined distance threshold. However, in the case where objects are located out of the predetermined distance range, picture quality will deteriorate.

In this case, if a preemptive focal distance due to the structural limitations (a relatively great aperture diameter and/or a relatively narrow gap between lenses, etc.) of the wafer-level lens module is set to be a long focal distance, images formed on the image sensor 60 will show worse picture quality for nearby objects (macro) than for distant objects (for example, infinity). In other words, images formed on the image sensor 60 by the wafer-level lens module will show less clarity for nearby objects, and accordingly the size of a spot formed on the image sensor 60 will also show a significant difference from that at an ideal size.

In order to form images satisfying specific resolution criteria and specific spot size criteria when the wafer-level lens module is positioned close to an object (for example, macro-focus), the wafer-level lens module according to the current example corrects the profile of an effective lens. By correcting the profile of the effective lens, a depth of field (DOF) increases but images with relatively excellent picture quality can still be obtained in a macro-focus mode as well as in an infinity-focused mode. Here, the "effective lens" refers to at least one of lens elements adjacent to the aperture in the wafer-level lens module. For example, in the wafer-level lens module illustrated in FIG. 2, the lens elements 14 and 24 adjacent to the aperture stop 18 may be effective lenses. Also, the meaning of "correcting a profile" refers to varying the profile of a lens surface by adding an error function to an optimized aspheric function. As a result, as expressed by Equation 1 below, an aspheric function of a corrected effective lens (that is, an EDF lens) may be represented as a sum of an optimized aspheric function Z and an error function E. The optimized aspheric function Z and the error function E are respectively expressed by Equations 2 and 3 below.

Aspheric Function of EDF lens=Optimized Aspheric Function+Error Function (1)

$$Z = \frac{cX^2}{1 + \sqrt{1-(K-1)c^2r^2}} + A_4 r^4 + A_6 r^6 + A_8 r^8 + \ldots \quad (2)$$

$$E = \sum_{n=2}^{n=6} a_{2n} r^{2n} = a_4 r^4 + a_6 r^6 + a_8 r^8 + a_{10} r^{10} + a_{12} r^{12} \quad (3)$$

Here, c represents a basic curvature of the EDF lens, k represents a conic constant, and A and a represent aspheric deformation constants of the optimized aspheric function Z and the error function E, respectively.

The error function E shown in Equation 3 may be obtained according to the following principle. In the optimized aspheric function Z expressed as Equation 2, aspheric deformation coefficients having main influence on the profile of the center and outer portions of a lens are $A_4, A_6, A_8, A_{10}$ and $A_{12}$ and the aspheric deformation coefficients $A_{14}, A_{16}$, etc. have main influence on the profile of the edge portion ($\geq 0.9R$) of the lens. Accordingly, upon correcting the profile of a lens, high-order aspheric deformation coefficients, such as $A_{14}$, $A_{16}$, etc., are fixed. Also, in regard to an infinity-focused image, the profile of the lens, even the profile of the lens's center portion, is not corrected because such an infinity-focused image itself has excellent picture quality (accordingly, c and k are "0"). In other words, the profile of the effective lens is corrected by varying the aspheric deformation coefficients $A_4, A_6, A_8, A_{10}$ and $A_{12}$.

Figure 3:
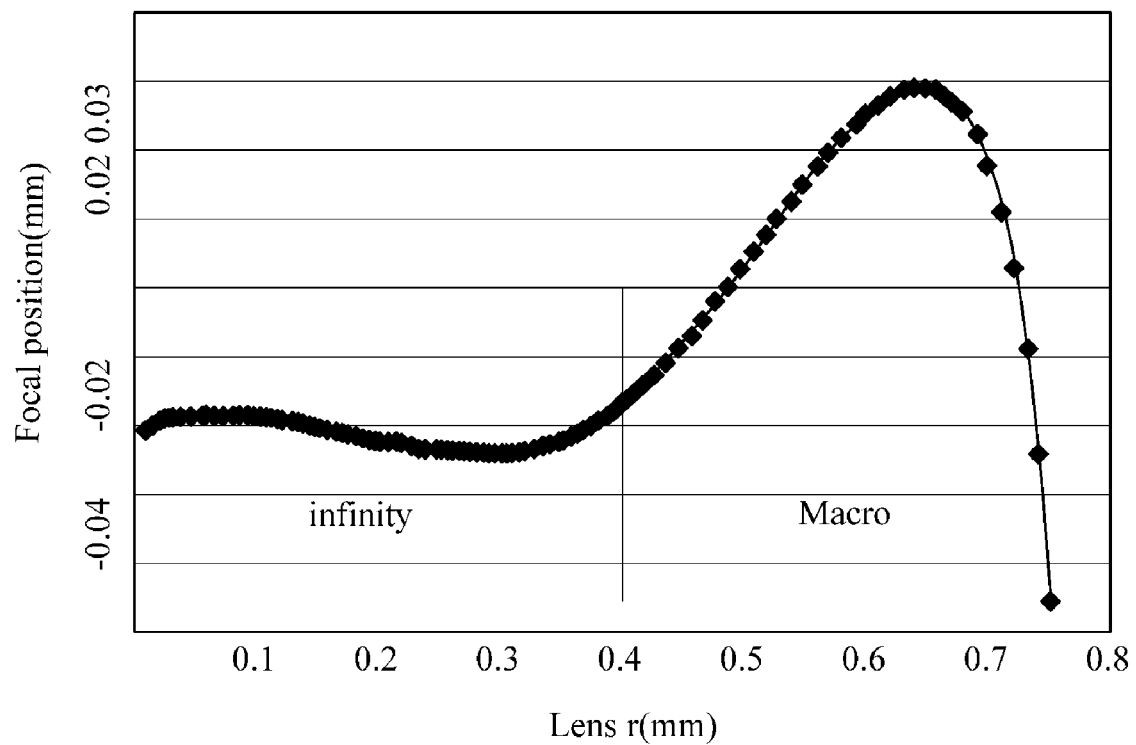
FIG. 3 is a graph plotting an example of focal position distributions used to design an extended depth of field (EDF) lens according to an example.

FIG. 3 is a graph plotting an example of focal position distributions used to design an extended depth of field (EDF) lens according to an example. In FIG. 3, the transverse axis represents a distance from the center of the EDF lens, that is, a radius R, and the longitudinal axis represents a focal position (a degree of defocusing) from an image-forming surface (hereinafter, referred to as an "image surface") of a corresponding image sensor. Referring to FIG. 3, in a wafer-level lens module including the EDF lens, the center portion (for example, where R is less than 0.4 mm) of the EDF lens exhibits a shorter focal distance (that is, the focal point is positioned in front of an image surface), and the outer portion (for example, where R is between 0.5 mm and 0.7 mm) of the EDF lens exhibits a longer focal distance (that is, the focal point is positioned behind the image surface).

In order to obtain the focal position distributions shown in FIG. 3, in the wafer-level lens module, the profile of an effective lens may be corrected such that rays passing through the center portion of the effective lens form an infinity-focused image and rays passing through the outer portion of the effective lens form a macro-focused image. Correction of the profile of the effective lens may be performed by correcting one or both lens surfaces thereof, and correcting one lens surface may facilitate the lens design due to simplicity of calculations and low complexity of its error profile.

Figure 4A:
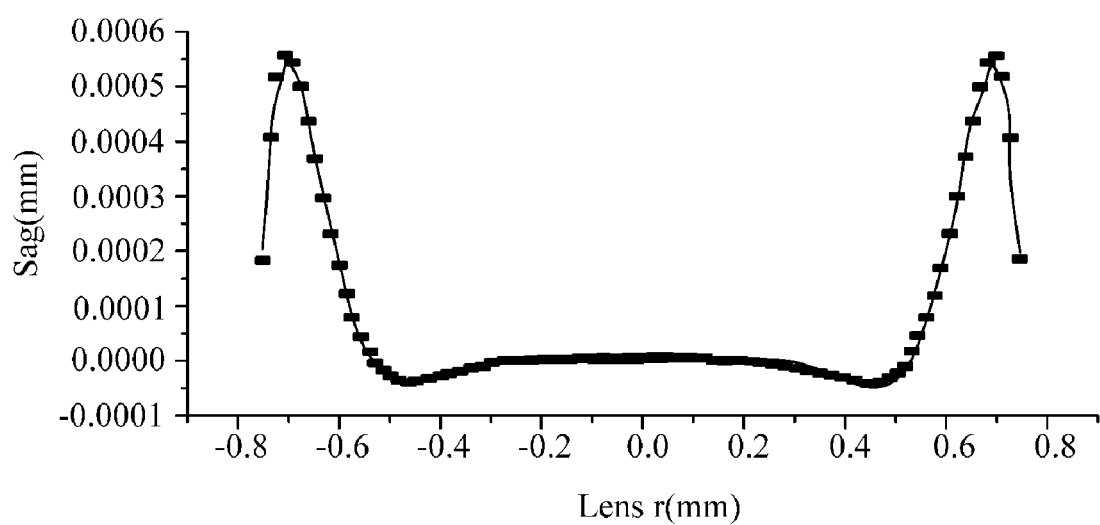
FIGS. 4A and 4B are graphs showing examples of error functions used to correct the profile of an effective lens.
Figure 4B:
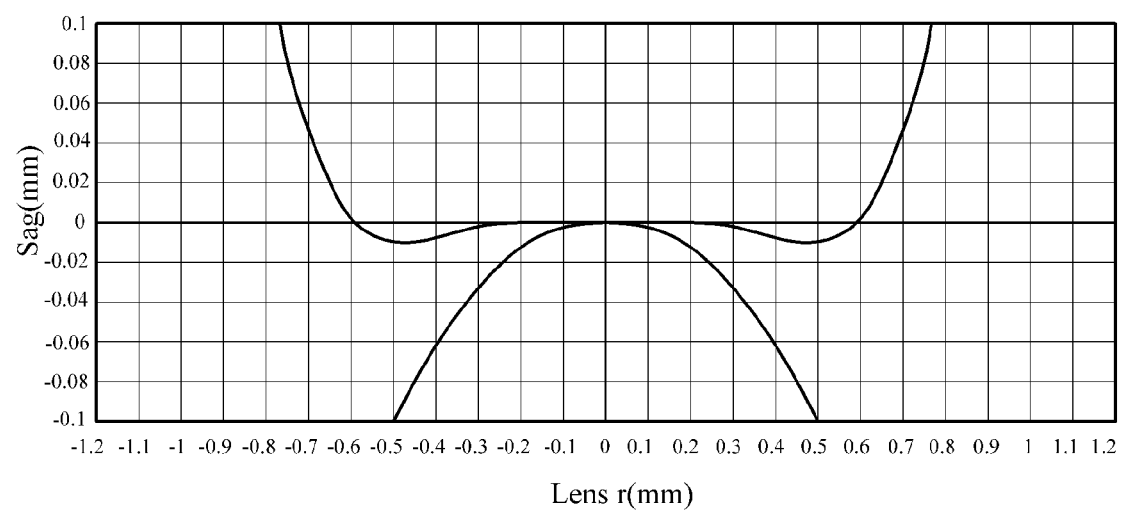

FIGS. 4A and 4B are graphs showing examples of error function values (sag) used to correct the profile of an effective lens in order to obtain the focal position distributions shown in FIG. 3. The graphs of FIGS. 4A and 4B may show profile errors that are added to the top wafer-scale lens (the first lens) of the wafer-level lens module illustrated in FIG. 2. That is, the effective lens is a lens element of the top wafer-scale lens of the wafer-level lens module illustrated in FIG. 2.

When an error function E is expressed as the above Equation 3, aspheric deformation coefficients a have values of $a_4 = -0.00135$, $a_6 = -0.00046$, $a_8 = -0.03982$, $a_{10} = 0.31237$ and $a_{12} = -0.4130$ if the error function E follows the graph illustrated in FIG. 4A, and if the error function E follows the graph illustrated in FIG. 4B, the aspheric deformation coefficients a have values of $a_4=-0.00156$, $a_6=-0.04368$, $a_8=0.27796$, $a_{10}=-0.51322$ and $a_{12}=0.32131$. Referring to FIGS. 4A and 4B, the error function E may be divided into three portions: a first portion having an error of 0, a second portion having negative errors and a third portion having positive errors, according to the polarity of applied errors.

In more detail, the first portion is a region where the value (sag) of the error function E is "0", the region corresponding to the center area of the effective lens. In other words, in the center area of the effective lens, no correction is made on a profile of a lens surface satisfying an optimized aspheric function. The center area of the effective lens may be a portion within about 10% of the total radius of the effective lens around the center point, specifically, within about 7%.

The second portion is a region where the value (sag) of the error function E is negative (−), and the region corresponds to the middle area of the effective lens. In the middle area of the effective lens, a negative error is applied to the profile of the lens surface satisfying the optimized aspheric function. The applied error may be from about −0.03 μm to about −0.15 μm. The middle area has a ring shape (a donut shape) outside the center point of the effective lens and may be a portion between about 40-50% of the total radius of the effective lens.

The third portion is a region where the value of the error function E is positive (+), and the region corresponds to the edge area of the effective lens. In other words, in the edge area of the effective lens, a positive error is applied to the profile of the lens surface satisfying the optimized aspheric function. The applied error may be about 8 times or more the error applied to the middle area of the effective lens and may have a value up to 3 times an available wavelength. For example, an error to be applied to the edge area of the effective lens may be from about 0.5 μm to about 1.2 μm when it is assumed that visible rays are applied. The edge area is the remaining portion of the effective lens excluding the center and middle portions and may have a ring shape (a donut shape) outside the middle portion of the effective lens.

Figure 5:
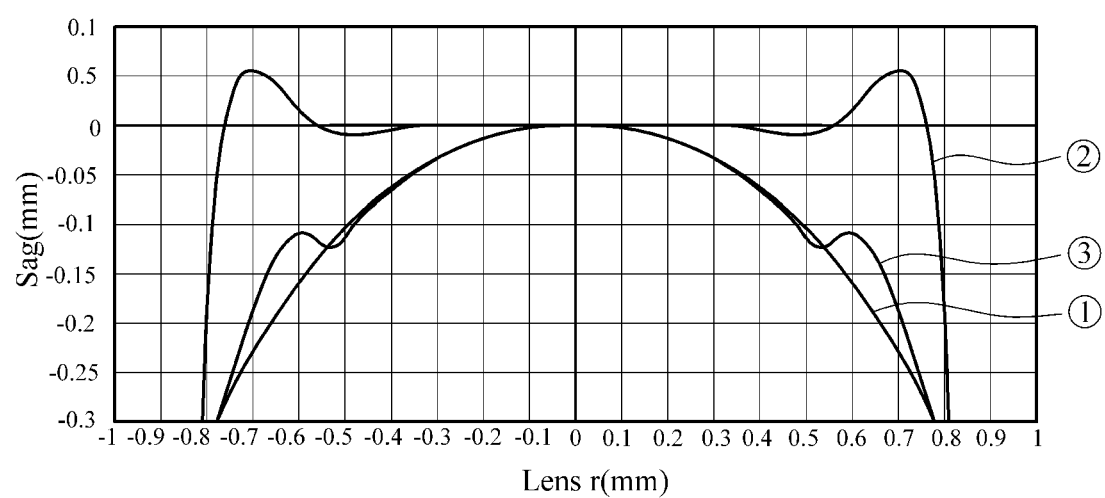
FIG. 5 shows a profile of a front surface of a first lens of an optimized lens module, a profile of an error function used to correct the profile of the front surface, and a final profile obtained by applying the error function to the front surface of the first lens.

FIG. 5 shows a profile ① of the front surface of the first lens of the optimized lens module, a profile ② of an error function used to correct the profile of the front surface, and a final profile (that is, a corrected profile) ③ obtained by applying the error function to the front surface of the first lens. Here, the profile ① may be the profile of the lens surface 14 illustrated in FIG. 2 and the profile ② may be the profile of the error function illustrated in FIG. 4B. Accordingly, the wafer-level lens module according to the current example has a corrected profile ③ of the effective lens which is the top wafer-scale lens of FIG. 2, the effective lens being an EDF lens.

Figure 6:
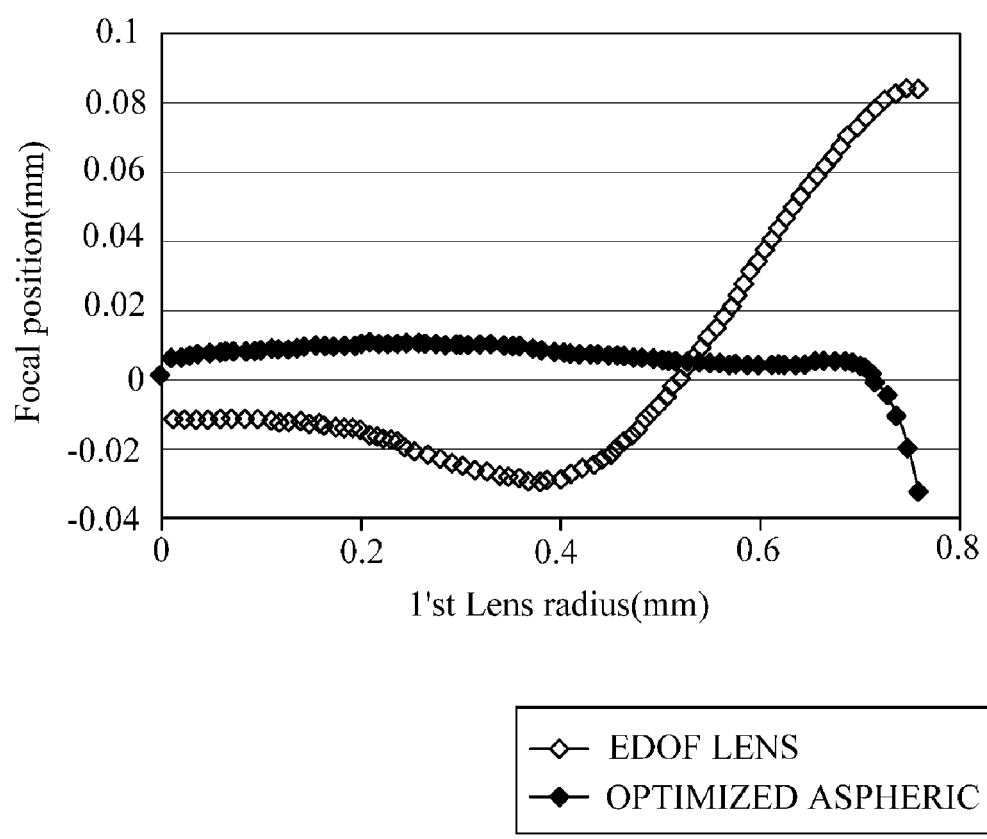
FIG. 6 is a graph showing the focal positions of rays that respectively pass through an optimized aspheric lens and an EDF lens.

FIG. 6 is a graph showing the focal positions of rays that pass through the EDF lens. In FIG. 6, for convenience of description, the focal position of a ray that passes through the optimized aspheric lens is also shown. It is seen from FIG. 6 that when the wafer-level lens module having the optimized aspheric lens is utilized, the focal position of a ray that passes through the major portion of the effective lens falls within a relatively narrow range, whereas when the wafer-level lens module having the EDF lens according to the current example is utilized, a degree of defocusing of a ray passing through the effective lens is within a range of about 20 μm.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wafer-level lens module comprising:
   a plurality of wafer-scale lenses stacked with fixed distances therebetween,
   wherein the plurality of wafer-scale lenses comprises an effective lens having a profile which satisfies a corrected optimized aspheric function, such that a profile of a center region of the effective lens is optimized for an infinity-focused image and a profile of an edge region of the effective lens is optimized for a macro-focused image
   wherein the effective lens comprises:
      a first portion having a profile satisfying an optimized aspheric function, the first portion disposed at a radial center of the effective lens,
      a second portion having a profile satisfying the optimized aspheric function with a negative error correction, the second portion radially surrounding the first portion, and
      a third portion having a profile satisfying the optimized aspheric function with a positive error correction, the third portion radially surrounding the second portion.

2. The wafer-level lens module of claim 1, wherein the first portion extends to a radius not greater than about 10% of the outer radius of the effective lens, and the second portion extends to a radius not greater than about 40% to 50% of the outer radius of the effective lens.

3. The wafer-level lens module of claim 1, wherein the negative error correction applied to the profile of the second portion is from −0.03 μm to −0.15 μm, and the positive error correction applied to the profile of the third portion is 8 or more times an absolute value of the negative error correction.

4. The wafer-level lens module of claim 3, wherein the positive error of the third portion is 3 times a wavelength range of visible rays.

5. The wafer-level lens module of claim 1, wherein only one lens surface of the effective lens has a profile satisfying the corrected optimized aspheric function.

6. The wafer-level lens module of claim 1, wherein a focal position of all rays passing through the effective lens are within a range of 20 μm.

7. The wafer-level lens module of claim 1, wherein the profile of the effective lens comprises the optimized aspheric function having an error function applied thereto, wherein the error function is expressed as:

$$E = \sum_{n=2}^{n=6} a_{2n} r^{2n} = a_4 r^4 + a_6 r^6 + a_8 r^8 + a_{10} r^{10} + a_{12} r^{12},$$

where r is a radius of the effective lens and a are aspheric deformation constants of the error function, wherein $a_4=-0.00135$, $a_6=-0.00046$, $a_8=-0.03982$, $a_{10}=0.31237$ and $a_{12}=-0.4130$.

8. The wafer-level lens module of claim 1, wherein the profile of the effective lens comprises the optimized aspheric profile having an error function applied thereto, wherein the error function is expressed as:

$$E = \sum_{n=2}^{n=6} a_{2n}r^{2n} = a_4r^4 + a_6r^6 + a_8r^8 + a_{10}r^{10} + a_{12}r^{12},$$

where r is a radius of the effective lens and a are aspheric deformation constants of the error function, wherein $a_4 = -0.00156$, $a_6 = -0.04368$, $a_8 = 0.27797$, $a_{10} = -0.51322$ and $a_{12} = 0.32131$.

9. A 5 million-pixel imaging device comprising the wafer-level lens module of claim 1.

10. An imaging device comprising the wafer-level lens module of claim 1.

11. A method of manufacturing an extended depth of field (EDF) lens for a mobile device, comprising:
determining a profile of the EDF lens which satisfies an optimized aspheric function modified by predetermined profile errors, and forming the EDF lens according to the determined profile,
wherein the predetermined profile errors are determined such that the EDF lens comprises:
a first portion having a profile satisfying the optimized aspheric function, the first portion disposed at a radial center of the EDF lens,
a second portion having a profile satisfying the optimized aspheric function with a negative error correction, the second portion radially surrounding the first portion, and
a third portion having a profile satisfying the optimized aspheric function with a positive error correction, the third portion radially surrounding the second portion.

12. The method of claim 11, wherein the first portion extends to a radius not greater than about 10% of the outer radius of the effective lens, and the second portion extends to a radius not greater than about 40-50% of the outer radius of the effective lens.

13. The method of claim 11, wherein the negative error correction applied to the profile of the second portion is from −0.03 μm to −0.15 μm, and the positive error correction applied to the profile of the third portion is 8 or more times an absolute value the of negative error correction.

14. The method of claim 11, wherein the predetermined profile errors are determined such that a focal position of rays passing through the effective lens are within a range of 20 μm.

15. The method of claim 11, wherein the optimized aspheric function Z is expressed by:

$$Z = \frac{cX^2}{1 + \sqrt{1 - (K-1)c^2r^2}} + A_4r^4 + A_6r^6 + A_8r^8 + \ldots$$

and
the error function E is expressed by:

$$E = \sum_{n=2}^{n=6} a_{2n}r^{2n} = a_4r^4 = a_4r^4 + a_6r^6 + a_8r^8 + a_{10}r^{10} + a_{12}r^{12},$$

wherein r is a radius of the effective lens, c is a basic curvature, k is a conic constant, A is an aspheric deformation constant of the optimized aspheric function, an a is an aspheric deformation constant of the error function, wherein $a_4 = -0.00134$, $a_6 = -0.00046$, $a_8 = -0.03982$, $a_{10} = 0.31237$ and $a_{12} = -0.4230$.

16. The method of claim 11, wherein the optimized aspheric function Z is expressed by:

$$Z = \frac{cX^2}{1 + \sqrt{1 - (K-1)c^2r^2}} + A_4r^4 + A_6r^6 + A_8r^8 + \ldots ,$$

and
the error function E is expressed by:

$$E = \sum_{n=2}^{n=6} a_{2n}r^{2n} = a_4r^4 + a_6r^6 + a_8r^8 + a_{10}r^{10} + a_{12}r^{12},$$

wherein r is a radius of the effective lens, c is a basic curvature, k is a conic constant, A is an aspheric deformation constant of the optimized aspheric function, and a is an aspheric deformation constant of the error function, wherein $a_4 = -0.00156$, $a_6 = -0.04368$, $a_8 = -0.27797$, $a_{10} = -0.51322$ and $a_{12} = 0.32131$.

* * * * *